(12) United States Patent
Yuan

(10) Patent No.: US 7,780,928 B2
(45) Date of Patent: Aug. 24, 2010

(54) METHOD AND APPARATUS FOR IMPROVING RADIAL FLOW MOVING BED REGENERATION/REACTION SYSTEM PERFORMANCE

(76) Inventor: Leon Yuan, 2 F., No. 36, Alley 19 Lane 160, Sec. 3, Mincyuan E. Rd., Songshan District, Taipei (TW)

( * ) Notice: Subject to any disclaimer, the term of this patent is extended or adjusted under 35 U.S.C. 154(b) by 508 days.

(21) Appl. No.: 11/926,257

(22) Filed: Oct. 29, 2007

(65) Prior Publication Data
US 2009/0110616 A1 Apr. 30, 2009

(51) Int. Cl.
*B01J 8/08* (2006.01)
*F27B 15/08* (2006.01)

(52) U.S. Cl. ............ 422/211; 422/139; 422/143; 422/144; 422/145; 422/147; 422/213; 422/216; 422/218; 422/220; 422/223; 422/228

(58) Field of Classification Search ............... 422/139, 422/143, 144, 145, 147, 211, 213, 216, 218, 422/220, 223, 228
See application file for complete search history.

(56) References Cited

U.S. PATENT DOCUMENTS

| | | | | |
|---|---|---|---|---|
| 3,706,536 A * | 12/1972 | Greenwood et al. | ......... | 422/191 |
| 3,909,208 A * | 9/1975 | Boret et al. | ................ | 422/218 |
| 4,110,081 A * | 8/1978 | Millar et al. | ............... | 422/213 |
| 4,135,886 A * | 1/1979 | Kuchar | ..................... | 422/216 |
| 4,277,444 A * | 7/1981 | Van Landeghem | ......... | 422/191 |
| 4,405,562 A * | 9/1983 | Zardi et al. | ................ | 422/148 |
| 4,578,370 A * | 3/1986 | Greenwood | ................ | 502/37 |
| 4,859,643 A * | 8/1989 | Sechrist et al. | ............. | 502/37 |
| 4,880,604 A * | 11/1989 | Koves | ...................... | 422/220 |
| 4,977,119 A * | 12/1990 | Koves | ...................... | 502/48 |
| 5,053,371 A * | 10/1991 | Williamson | ................ | 502/37 |
| 5,277,880 A * | 1/1994 | Sechrist et al. | ............. | 422/216 |
| 5,833,936 A * | 11/1998 | Euzen et al. | ............... | 422/192 |
| 6,103,652 A * | 8/2000 | Brunet et al. | ............... | 502/37 |
| 6,290,916 B1* | 9/2001 | Sechrist et al. | ............. | 422/145 |
| 6,689,331 B1* | 2/2004 | Brunet et al. | ............... | 422/223 |
| 7,045,477 B2* | 5/2006 | Zhao et al. | ................. | 502/38 |

* cited by examiner

*Primary Examiner*—Walter D Griffin
*Assistant Examiner*—Huy-Tram Nguyen

(57) ABSTRACT

An improved radial or cross flow moving bed regenerator or reactor, in which the solid particle residence time in the vessels can be changed in different section of the regenerator or reactor. The improvement results from the placement of one or multiple screen inserts which divides the radial or cross flow bed into separate solid flow channels. The residence time of the solid in each solid flow channels are optimized based on the regeneration or reaction requirement by changing the location, orientation and geometry of the screen inserts. As a result of the optimization of solid residence time in different section in the radial flow bed, the efficiency of a regenerator or a reactor is improved.

18 Claims, 7 Drawing Sheets

METHOD AND APPARATUS FOR IMPROVING RADIAL FLOW MOVING BED REGENERATION/REACTION SYSTEM PERFORMANCE

BACKGROUND OF THE INVENTION

1. Field of the Invention

This invention relates to the apparatus of the type that the gravitational moving solid particle is reacting with the radial flow fluid. The components in the radial flow fluid react with the moving solid particle such as catalyst.

2. Description of the Prior Art

The radial flow reactor and regenerator are well known in the art for hydrocarbon processing in the petroleum and petrochemical industry. The radial reactor and regenerator are annular contactors in which catalyst particle bed is held in place by two concentric cylindrical particle retaining screens. The radial flow reactor is shown, for instance, by U.S. Pat. Nos. 3,927,987; 3,907,511; 3,882,015; 3,799,866, 3,785,963 and 3,692,496. The radial flow regenerator is shown, for instance, by U.S. Pat. Nos. 3,652,231 and 3,647,680. This type of radial flow contactor provides the benefits over the other conventional contactors in that the pressure drop across the radial flow contactor is lower, which reduces the recycle compressor capital and utility requirement. To convert the hydrocarbons into useful products, the temperature and pressure are carefully controlled in these radial flow reactors. Invariably the catalysts used in the reactor become deactivated for one or more reasons. One of the most common reasons for deactivation is the accumulation of coke on the catalyst. To restore the performance of the deactivating catalyst, careful reconditioning of the catalyst and burning of the accumulated coke is frequently done. The catalyst is reactivated by contacting of the coke containing catalyst at high temperature with an oxygen containing gas to combust in a regenerator where the catalyst with coke is moving through a radial bed vertically and with oxygen containing gas flowing radially across it. In the continuous or semi-continuous regeneration process, coke laden catalyst particles are at least periodically added and withdrawn from a bed where the coke is combusted. The oxygen containing gas and catalyst with coke reacts in an annular bed. U.S. Pat. No. 3,652,231 shows regeneration apparatus for a continuous catalyst regeneration process. This regeneration apparatus is used in the catalytic reforming of hydrocarbons in a constant-width movable bed of catalyst. U.S. Pat. Nos. 3,647,680 and 3,692,496 also deal with regeneration of reforming catalyst.

A great deal of research and development has been made to improve the design and efficiency of the radial flow reactor/regenerator. U.S. Pat. No. 6,103,652 discloses a staged combustion process and apparatus for regenerating a catalyst in a moving bed that includes at least two separate successive combustion zones. In order to ensure uniform flow of catalyst in the annular bed in the radial flow reactor, a number of the catalyst withdrawal systems employed at the bottom of the catalyst bed are used with centrally located catalyst passages. Typically these have consisted of a number of catalyst withdrawal conduits located below the two catalyst retention screens, with the upper end of each conduit being covered by a conical cap designed to allow equal catalyst flow from every direction. This is shown in U.S. Pat. Nos. 3,706,536, 3,785,963, 3,854,887 and 4,110,081. U.S. Pat. No. 5,157,181 discloses a radial flow reactor with greater annular bed depth in the lower section than upper section in order to maintain near constant catalyst active site. U.S. Pat. No. 4,859,643 discloses a method for regenerating coke containing catalyst particles that confines particles in the combustion section of a regenerator zone to a tapered bed configuration. The tapered bed minimizes surface area loss of the catalyst by increasing the catalyst particle velocity in the high temperature zone and reduces the time that catalyst is exposed to high temperature. This method increases the particle downward velocity in the top section that has a thinner bed depth.

As shown in the previous references, most of the efforts in the prior art are made to achieve uniform solid flow and eliminate the dead spaces between the annular bed. Some vary the catalyst particle velocities at different axial elevation in the annular bed by using tapered bed configuration. The particle velocity increases in the axial direction as the radial bed depth decreases but the particle velocity is similar radially at the same axial elevation. The fluid traverses across the radial bed is maldistributed with the higher flow rate at the thinner section of the bed. This can govern the design of moving bed because the high cross flow rate can stop the catalyst moving by pinning the catalyst against the retaining wall and higher flow rate in the thinner bed section may lead to adverse effect in reaction. Therefore, it is important to develop a novel method and apparatus to optimize the reaction efficiency without significantly impacting the traverse flow pattern and leading to maldistribution of traverse flow.

SUMMARY OF THE INVENTION

This invention improves the efficiency of the moving bed radial flow reactor/regenerator or other type of contacting vessel having downward catalyst movement characteristics. The improvement is achieved through the use of internal screen inserts that divide the catalyst bed into different flow channels. By changing the location, geometry/slope and the bottom cross sectional opening of each particle flow channels, the residence time of the particle or the particle velocity can be adjusted in each flow channel to optimize the efficiency.

DESCRIPTION OF THE PREFERRED EMBODIMENTS

Figure 1:
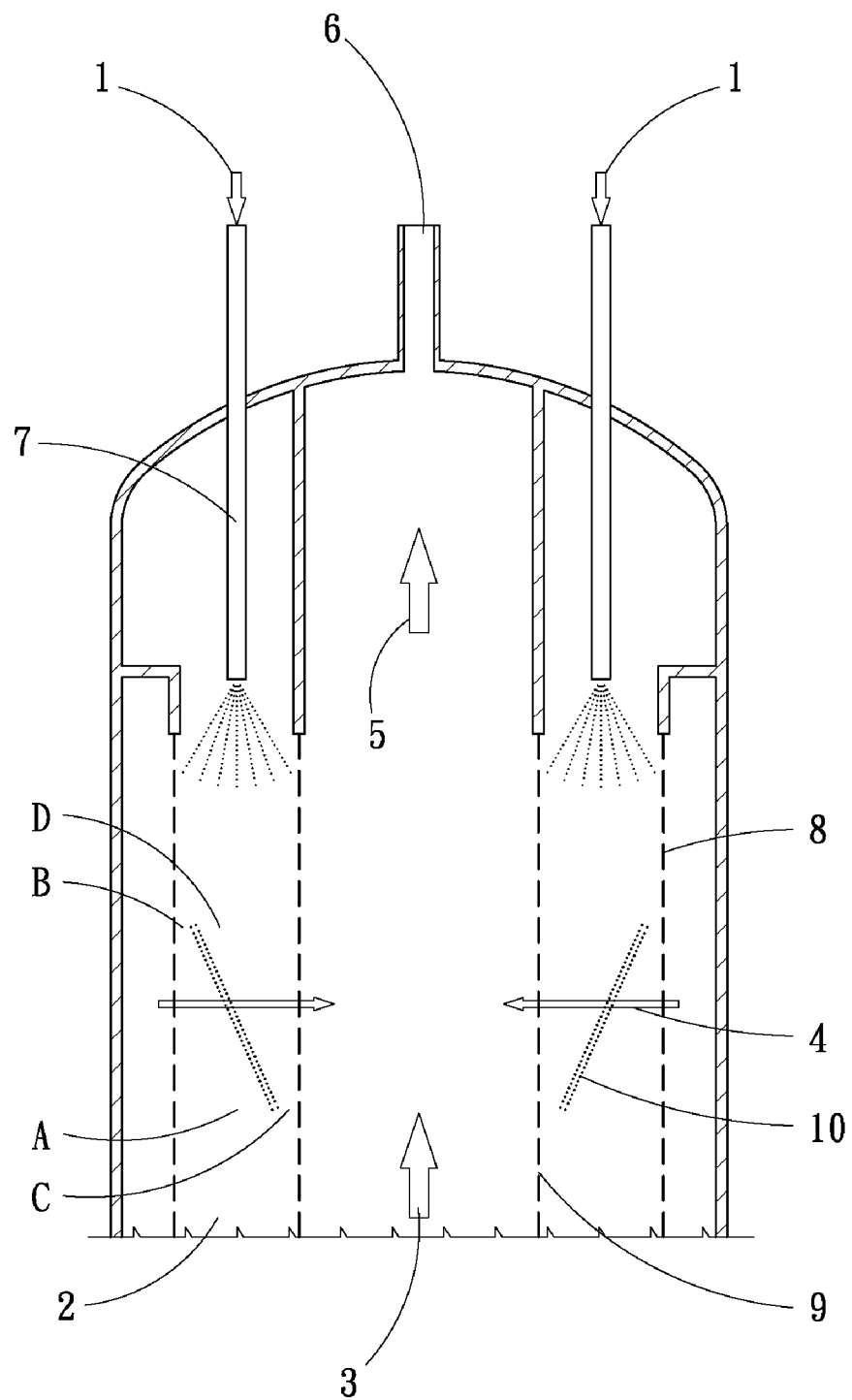
FIG. 1 presents the burn zone of a radial flow moving bed regenerator. A new intermediate screen is inserted between the outer basket screen and center pipe screen.

The present invention is applicable to the moving bed reactor, regenerator where the efficiency of reaction, regeneration with the cross flow fluid can be improved by optimizing the solid particle residence time in the vessel. The radial flow fluid-solids contacting apparatus is used in a wide variety of industrial processes. These processes include but not limited to the isomerization of normal paraffins, the dehydrogenation of normal paraffins and reforming of naphtha boiling range petroleum fractions. It is well known, in a radial flow reactor, the various reactants flow along radials between the major central axis of the reactor and its periphery. For a typical reactor or regenerator of a catalytic reforming process, the reactant flow is inward. That is, the reactants flow inward from the annular reactant distribution volume to a cylindrical reactant collection volume. The annular reactant distribution volume is between the vessel shell and the outer catalyst retention screen or punch plate. The outer catalyst retention screen or punch plate is commonly referred to as the outer basket screen or scallop. The central reactant collection volume is enclosed by the inner catalyst retention screen, which is commonly referred to as the center pipe. Briefly, the feedstock is mixed with a recycle stream comprising hydrogen and contacted with a catalyst in a reaction zone. The feedstock is a petroleum fraction known as naphtha and having an initial boiling point of about 180° F. and an end boiling point of about 400° F. The feedstock quality improves by aromatization through dehydrogenation, cyclization and isomerization. Further information on catalytic reforming process can be found in, for example, U.S. Pat. Nos. 4,409,095 and 4,440,626.

In a first embodiment of the present invention, a radial flow moving bed regeneration/reaction system is disclosed, in which a plurality of solid particles moves gravitationally into and out of the system in a continuous or semi-continuous mode, the mentioned system comprises a vertically oriented cylindrical outer vessel, an outer cylindrical particle retention screen, an inner cylindrical particle retention screen, and at least one intermediate screen. Both the outer screen and the inner screen are located within the outer vessel and concentric with the central vertical axis of the outer vessel. Furthermore, an annular reactant distribution volume is defined between the vessel and the outer screen, wherein the annular reactant distribution volume is communicated with at least one reactant inlet conduit for introducing a reactant fluid. Additionally, an annular particle retention volume is defined between the outer screen and the inner screen, wherein the annular particle retention volume is used for the regeneration/reaction, at least one particle inlet conduit communicates with the upper end of the annular particle retention volume, at least one particle withdrawal conduit communicates with the lower end of the annular particle retention volume, and a bed depth is defined as the distance between the outer screen and the inner screen.

In this embodiment, at least one intermediate screen is inserted between the outer screen and the inner screen in the particle retention volume. The reactant fluid traverses across the intermediate screen but with no solid particle traverses across it. The intermediate screen divides the annular particle retention volume in all or at least part of the volume into at least two flow channels, by adjusting the intermediate screen location or slope or cross sectional opening at the bottom of the intermediate screen, the residence time of the solid particle in at least one flow channel is changed. In other words, there is at least one flow channel has different bottom cross sectional area than all or part of the cross sectional area above it in the same flow channel. Moreover, a cylindrical effluent collection volume is defined within the inner screen, wherein at least one reactant outlet conduit communicates with the effluent collection volume.

There are two preferred designs of the intermediate screen: cone-shape and combined shape with cylinder and cone. For the case with single intermediate screen insert, the intermediate screen divides the annular particle retention volume into outer and inner flow channels. Therefore, there are also two preferred cases of the flow channels: First, the outer flow channel formed between the intermediate screen and the outer screen is tapered in the lower section with a smaller cross sectional area than the average cross sectional area of the same flow channel, so as to increase the residence time of the solid particles in outer flow channel; Second, the inner flow channel formed between the intermediate screen and the inner screen is tapered in the lower section with a smaller cross sectional area than the average cross sectional area of the same flow channel, so as to increase the residence time of the solid particles in inner flow channel.

Furthermore, the intermediate screen between the outer and inner flow channels form angle from horizontal in all or part of the screen and this angle is no less than the angle of repose of the solid particle in it. The moving velocity of the solid particles is equal to or less than 1 ft/minute.

In this embodiment, the solid particle comprises one selected from the group consisting of the following: catalyst, adsorbent. The reactant fluid comprises one selected from the group consisting of the following: diluted air for catalyst regeneration, hydrocarbons, flue gas, and waste stream from a process unit.

In a second embodiment of the present invention, a radial flow moving bed coke removal system is disclosed, in which a plurality of catalyst particles moves gravitationally into and out of the system in a continuous or semi-continuous mode, the mentioned system comprises a vertically oriented cylindrical outer vessel, an outer cylindrical catalyst retention screen, an inner cylindrical catalyst retention screen, and at least one intermediate screen. Both the outer screen and the inner screen are located within the outer vessel and concentric with the central vertical axis of the outer vessel. Furthermore, an annular reactant distribution volume is defined between the vessel and the outer screen, wherein the annular reactant distribution volume is communicated with at least one reactant inlet conduit for introducing an oxygen-containing gas. Additionally, an annular catalyst retention volume is defined between the outer screen and the inner screen, wherein the annular catalyst retention volume is used for the regeneration/reaction, at least one catalyst inlet conduit communicates with the upper end of the annular catalyst retention volume, at least one catalyst withdrawal conduit communicates with the lower end of the annular catalyst retention volume, and a bed depth is defined as the distance between the outer screen and the inner screen.

In this embodiment, at least one intermediate screen is inserted between the outer screen and the inner screen in the catalyst retention volume. The oxygen-containing gas traverses across the intermediate screen but with no solid particle traverses across the same screen, wherein the intermediate screen divides the annular catalyst retention volume in all or at least part of the volume into outer and inner flow channels, the inner flow channel formed between the intermediate screen and the inner screen is tapered in the bottom with a smaller cross sectional area than the average cross sectional area of the same flow channel, so as to increase the residence time of the catalyst particles in inner flow channel. The preferred designs of the intermediate screen are described in the first embodiment. Moreover, a cylindrical effluent collection volume within the inner screen, wherein at least one reactant outlet conduit communicates with the effluent collection volume. This leads to the improvement of the oxygen utilization and burning efficiency. The same regenerator will be able to burn more coke with no need to increase the burn zone volume or to revamp the regeneration blower. With the higher catalyst residence time in the inner flow channel, the same regenerator is capable to burn the coke on those catalyst with slower coke burning rate.

The catalytic reforming process is normally effected in the presence of catalyst particles comprised of one or more Group VII noble metals (e.g., platinum, iridium, rhodium, palladium) and a halogen combined with a porous carrier, such as refractory inorganic oxide. Alumina is a commonly used carrier. The halogen is normally chlorine. During the course of reforming reactions, catalyst particles become deactivated as the result of mechanisms such as the deposition of coke and loss of the chloride on the catalyst particles. After a period of used, the ability of catalyst to promote reforming reaction decreases to a point that the catalyst must be recondition. The deactivated catalyst is continuously or periodically flowing gravitationally between the outer and inner catalyst retention screen in the reactor and then transfer to a regenerator for reconditioning or regeneration. The coke is removed, the chloride adjusted, the particle is dried and the metal reduced during the regeneration. The regenerated catalyst particle is then fed back to the reactor's reaction zone.

Figure 2:
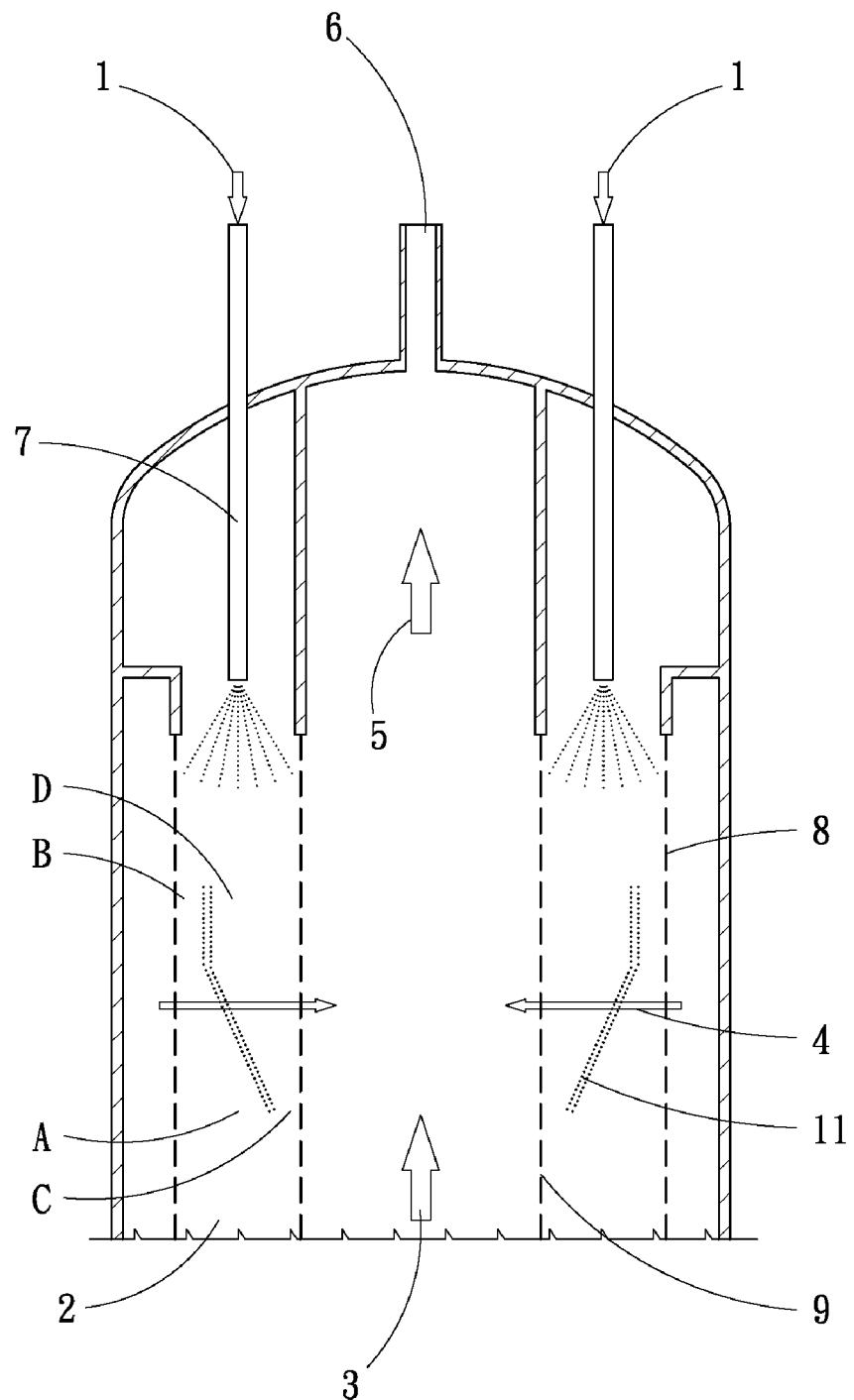
FIG. 2 presents an alternate design of the intermediate screen that is inserted into the burn zone of a radial flow moving bed regenerator.

In the regenerator, the coked catalyst is contacted with a hot oxygen containing gas stream (which is known as burn zone recycle gas) in order to remove the coke which accumulated on the catalyst while it was in the hydrocarbon conversion reaction zone. Coke is comprised primarily of carbon and hydrogen. The coke removal mechanism is done by oxidation of the carbon and hydrogen in a high temperature zone called burn zone. The carbon and hydrogen in the coke reacts with oxygen to form carbon dioxides, carbon monoxide and water. Coke content on the deactivated catalyst can be as much as 20% of the catalyst weight, but 4-7% is more typical. Coke is oxidized in the burn zone at a temperature range typically between about 800 to 1050° F. The localized peak temperature on the catalyst can reach about 1100° F. The oxygen concentration in the recycle gas enter the burn zone is usually on the order of 0.2 to 1.3% by volume but is typically controlled between 0.6% to 1%. The arrangement of a typical regenerator burn zone may be seen in U.S. Pat. No. 3,652,231. FIGS. 1 and 2 show the burn zone between two catalyst retention screens. The recycle gas 4 contains oxygen, $CO_2$, $H_2O$, nitrogen and small amount of contaminants traverse radially through the moving catalyst bed. The moving catalyst 1 is fed from the top of an annular bed contained by an outer basket screen 8 and inner center screen 9 and withdrawn from the bottom of the annular bed 2. As the hot recycle gas 4 quickly heats up the cool coked catalyst, the oxidation reaction proceeds faster and faster. All of the oxygen in the recycle gas supply to upper section of the moving catalyst bed is consumed by the oxidation reactions. The coke on catalyst continue depleted as it reacted with the oxygen in the recycle gas until it reach a point that the oxidation of coke is not fast enough to consume all the oxygen.

Figure 5:
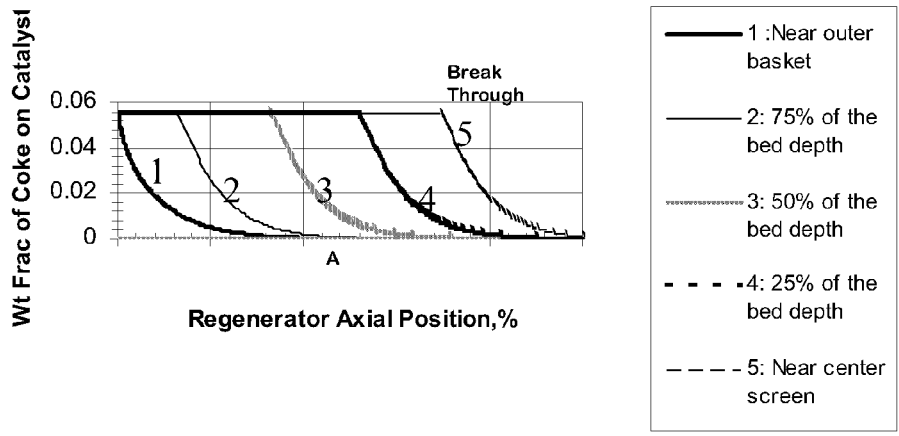
FIG. 5 illustrates the coke content of catalyst in the burn zone of a radial flow moving bed catalyst regenerator.

FIG. 5 illustrates the coke content of the spent catalyst in the burn zone of a continuous catalyst regenerator for a catalytic reforming process unit. Curve 1 in FIG. 5 shows that the coke on the catalyst burn quickly near the outer basket screen from which the $O_2$ containing gas is fed into the radial flow moving bed. As shown in the curve 2, the coke on the catalyst is completely burn at point A of the bed axially and at about 75% of the bed depth radially. The regenerator annular volume below point A in bed height and at between the outer basket and 75% bed depth is wasted as the coke on the catalyst is almost completely removed already. The regenerator volume is not being used efficiently. It is beneficial to move the coke free catalyst faster through this annular flow channel between the outer basket and 75% bed depth. Curve 5 in FIG. 5 shows that the coke on the catalyst does not burn significantly near the center pipe screen until about near the oxygen break through point because of the depletion of oxygen above the break through point. U.S. Pat. No. 4,859,643 discussed about the oxygen break through along the axial length for different radial bed geometry. By moving the catalyst faster at near the outer basket where catalyst is almost coke free and moving the coke catalyst slower near the center screen in the regenerator, the reaction volume that is not being used near the outer basket will be used more efficiently and the catalyst with coke near the center pipe screen can stay in burn zone longer with extra coke burning.

Figure 6:
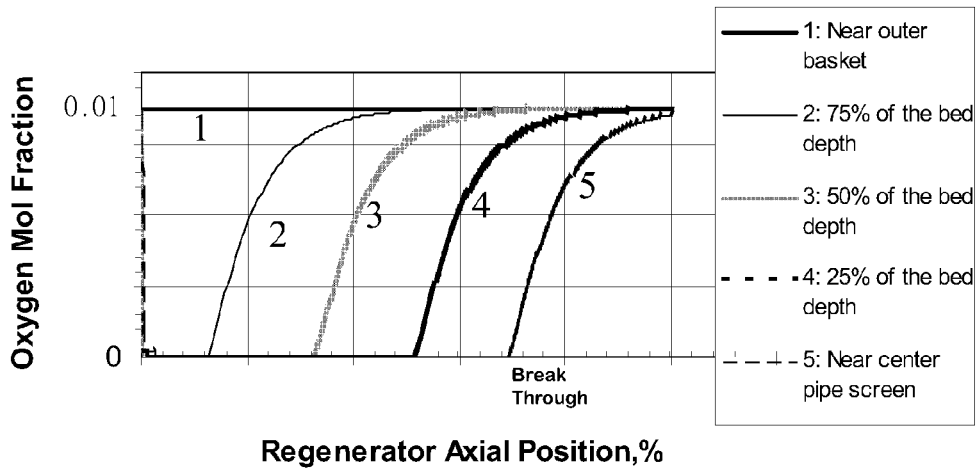
FIG. 6 illustrates the $O_2$ content inside the burn zone of a radial flow moving bed regenerator.

FIG. 6 further illustrates the $O_2$ content inside the burn zone of the continuous catalyst regenerator for a catalytic reforming process unit. Curve 1 in FIG. 6 shows the oxygen is at the highest concentration at the outer basket screen. At the same axial position, the $O_2$ concentration declines radially as it exiting the catalyst bed. Curve 5 shows that the $O_2$ is completely consumed near the top center screen opening and oxygen is available for coke burning near the center pipe area below the break through point at the axial bed position. The oxygen utilization is almost 100% until oxygen break through and then the oxygen utilization continues declining from the break through point to the bottom of the screen opening. The slower movement of the coked catalyst near the center pipe below the break through point can increase the time for burning and gives a more complete coke removal.

It is known to those skilled in the art that the catalyst particles have multiplicity of pores. The coke, which is deeper within the pores, may exhibit much slow rate of reaction therefore the oxygen break through but the coke is not remove completely. The oxidation of coke is commonly referred to as the combustion of coke. The combustion can be monitored by temperature typically. As the combustion rate declined, the temperature of the bed declined. The oxygen break through at the lower section of the bed with lower temperature leads to the decline in oxygen utilization. The oxygen in the recycle gas which is recycled by the regeneration blower is not completely consumed and being recycle again. Depends on the geometry of the radial bed, the oxygen break through point that is referred to in U.S. Pat. No. 4,859,643 can be at about 48.5% bed depth below the top of center screen perforation for the constant bed width burn zone and at 62% for a tapered bed. In addition to the geometry of the bed, this break through point or overall O2 utilization efficiency, coke profile as shown in FIG. 5 and Oxygen concentration profile as shown in FIG. 6 can depend upon many factors. The catalyst property, the burn gas and coked catalyst inlet temperatures, the oxygen concentration and the relative amount of circulation gas and coked catalyst and the system pressure can all more or less impact on the $O_2$ utilization efficiency. The coked catalyst is kept within the lower section of the burn zone until the coke content of the catalyst exiting the burn zone is about 0.2% or less. Much of the residual coke on catalyst is further burn in the oxychlorination zone in which the oxygen concentration of the gas phase can be 4%-~20%. Too much of the residual coke on the catalyst to the oxychlorination zone can leads to the high temperature in the zone and damage the vessel and catalyst.

The catalyst is moving near plug flow in the burn zone. The catalyst flowing near the outer basket screen 8 (recycle gas inlet) sees higher concentration of oxygen and the coke is almost completely removed at the lower section typically. On the other hand, the catalyst near the center screen 9 sees no oxygen at the top and reduced oxygen at the lower section of the burn zone. However, the catalyst is moving at the same velocity despite it is at near the outer basket or near the center screen. To improve the coke burning, it is beneficial to move the catalyst faster at near the outer basket screen and slower at near the center screen. To avoid the increase of the hot residence time in the burn zone that can increase the catalyst surface area decline and improve the burn efficiency, the top of the intermediate screen insert can be kept below the top of the center screen perforation and preferable at the oxygen break through point and above the center screen bottom perforation. A typical arrangement of the intermediate screen insert is shown in FIG. 1 and an alternate intermediate screen arrangement is given in FIG. 2.

Figure 8:
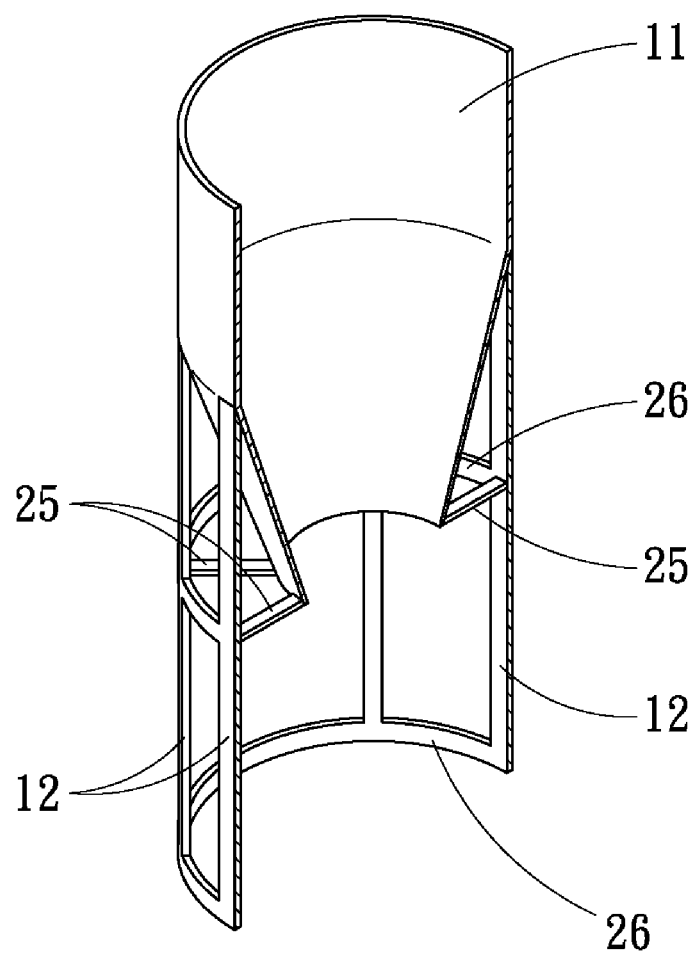
FIG. 8 presents a typical example of FIG. 2 with the intermediate screen 11, support rods 12, 25 and support ring 26.

The intermediate screen insert 10 and 11 changes the residence time of the catalyst in different section of the burn zone. By inserting a properly located screen in an angle between the outer basket and center screen, it is possible to improve the residence time of catalyst. This is accomplished by locating the sloped screen such that the bottom cross sectional opening of the annular between the outer basket screen and inserted intermediate screen (Area A) is larger than the cross sectional area of the annular (Area B). The area A is located at sufficient distance away from the catalyst exit such that the catalyst is uniformly withdrawn below it. The opening area A sets the volumetric withdrawal rate from the annular and decreases the residence time of the catalyst in the annular between the outer basket screen 8 and insert 10 or 11. On the other hand, the bottom cross sectional opening (Area C) of the inner annular between the screen 10 or 11 and center screen 9 is smaller than the cross sectional area of the inner annular (Area D). The area C sets the volumetric rate of the inner annular and leads to the higher catalyst residence time. By inserting a properly located intermediate screen, the catalyst with faster coke removal near the recycle gas inlet (basket screen 8) is moving out of the burn zone faster. The catalyst near the recycle gas exit (center screen 9) has less chance to see the full oxygen will be kept in the lower section of the regenerator longer. By changing the cross sectional area of the same annular flow channel at different axial level, it is possible to change the catalyst moving velocity or catalyst residence time in different section of the annular. This can be achieved by stacking the module in FIG. 8 one on top of another but with different cross sectional opening at the bottom of intermediate screen 11. By stacking two modules in between the outer basket and center pipe of a burn zone, keeping the catalyst cross communicate freely below the bottom intermediate screen of each module, it is possible to increase the velocity of the catalyst near the center pipe at the top high temperature burn zone where low residence time is desirable to reduce the surface area degradation and decrease the catalyst velocity near the center pipe and increase the velocity near the outer basket at the bottom of the burn zone to improve the coke burning.

The proper intermediate screen specification increases the utilization of oxygen and increases the amount of the coke burning without the need to increase the oxygen delivery to the burn zone. The revamp of the regeneration blower may be avoided. Because of the constant overall bed depth, the higher hot recycle gas flow to the top hot section as in U.S. Pat. No. 4,859,643 is avoided. The bulk temperature in the top burn zone is lower because of the hot recycle gas and cold catalyst thermal mass flow ratio is lower which reduces the thermal stress at the top of the center pipe screen and is beneficial to the catalyst surface area stability.

FIG. 1 illustrates a simple intermediate screen insert used in the radial flow regenerator. The spent catalysts 1 with coke is transferred into the burn zone annular by catalyst transfer pipes 7. The burn zone is formed between the outer basket screen 8 and center screen 9. The oxygen containing recycle gas 4 flows from the outer basket 8 to the center screen 9 and combined with the make up air 3 to form effluent gas 5 and exit the regenerator at the top nozzle 6. The coke on the spent catalyst is burn off in the burn zone. The coke free catalyst is transferred to the zone below and exit in conduit 2. The main component of the intermediate screen is a screen cone. The bottom of the screen cone has multiple support rods (not shown in FIG. 1) to support it. The support rods are arranged such that the cross communication of the solid particle and fluid flow across it is not substantially restricted. The bottom of the screen cone is at least at a minimum distance from the catalyst exit conduit 2. This minimum distance is defined by the bed depth (between the bottom of the outer basket 8 and center pipe screen 9) multiples by a minimum of 15% but preferable equal to or greater than 80% of the bed depth. The further the distance between the bottom of the screen cone and the catalyst particle exit conduit 2, the smaller is the end effect and the catalyst particle flow becomes plug flow. With the appropriate minimum distance from the catalyst particle exit conduit 2, the catalyst at the bottom of the screen cone is mobile and the velocity as uniform as possible. To avoid the maldistribution of the traverse fluid, the perforation of the intermediate screen 10 is such that the opening per area is preferable no less than that of the outer screen 8 or center screen 9 but is small enough to restrict the flow of the solid particle across the perforation.

Figure 7:
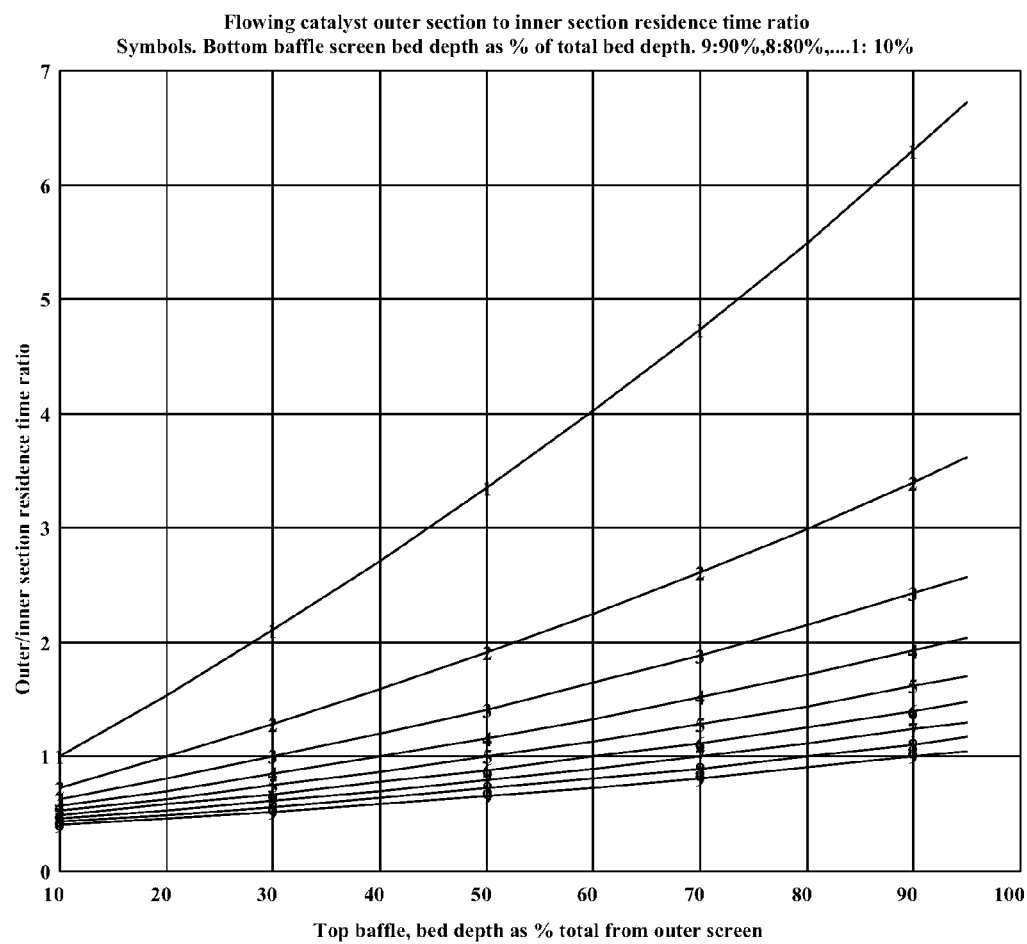
FIG. 7 illustrates the residence time ratio for the two particle flow channels separated by the intermediate screen insert.

FIG. 7 gives the effects of the cross sectional area at the top and bottom of the screen cone 10 on the relative catalyst residence time in the outer and inner annular. The bottom of the intermediate screen is situated at 3' away from catalyst withdrawal port that the end effect is negligible. By varying the top and bottom opening of the annular, the catalyst residence time ratio of the two annular separated by the intermediate screen cone can be changed. For example, the catalyst residence time in the annular near the outer basket can be 6 times of that near the center screen if the outer annular bed depth at the screen cone bottom is only at 10% and the bed depth at the top of the screen cone is at 86% of the total bed depth. On the other hand, the catalyst residence time in the annular near the outer screen can be 0.4 times of the catalyst residence time in the annular near the center pipe if the outer bottom annular bed depth is at 90% and the outer top annular bed depth is at 10%. It can be seen in FIG. 7, the acceleration of catalyst velocity in the annular is limited by the simple intermediate screen cone. An alternate design is given in FIG. 2. The intermediate screen insert is divided into two sections. The intermediate screen has straight screen at the top but with the screen cone at the bottom. This design decreases the volume and catalyst residence time in the annular near the outer screen substantially. The screen cones in FIGS. 1 and 2 are preferable to have an angle from horizontal plan that is greater than the angle of repose so that it can be drained properly. For a reaction system more sensitive toward dead space, this angle will be even larger so that the dead space can be avoided and the screen cone is preferable to have at least 60 degree from the horizontal.

It is well known that the catalyst in a catalytic reforming fixed bed reactor has higher coke content in the bottom bed than in the top. The coke buildup on the catalyst particle is fast at the beginning and slowdown as the coke content buildup. As the catalyst moves slowly in plug flow inside the radial flow reactor, the coke content on the catalyst near the reactant inlet will have less coke content than the catalyst near the center pipe where the reactant exit the bed. The mixing of the catalyst with different coke content takes place at the catalyst exit at the bottom of the reactor. It is beneficial to have more uniform coke loading on the catalyst because the catalyst regenerator design is govern by the highest coke content catalyst. The present invention can be used in the last reforming reactor to move the catalyst faster out of the center pipe region and lead to more uniform coke loading on the spent catalyst into the regenerator. More uniform coke loading on catalyst reduces the chances of high temperature excursion on some of the catalyst particle in the oxichlorination or calcination zone when the regenerator is operated near it's maximum capacity.

Figure 3:
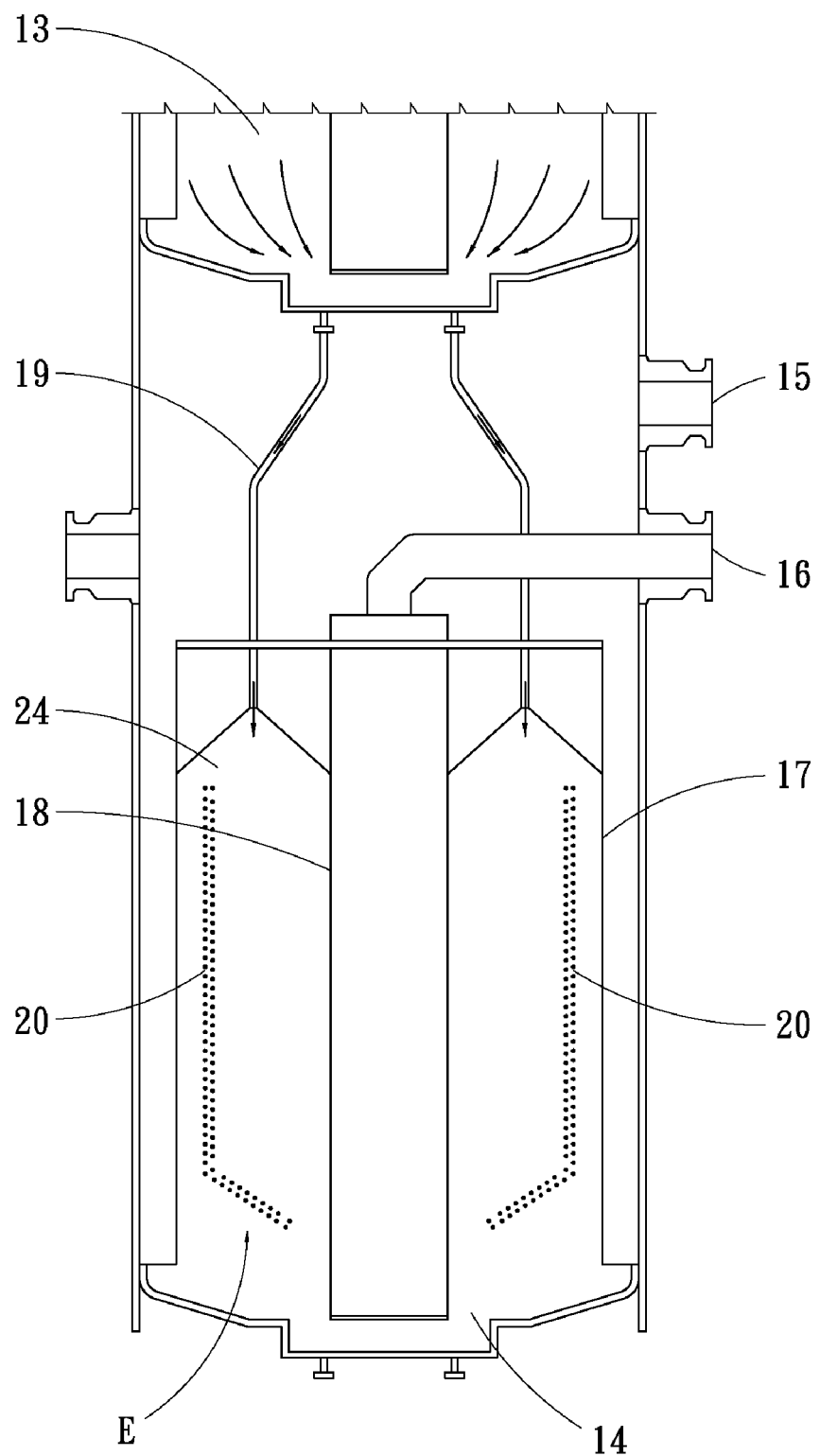
FIG. 3 presents a radial flow moving bed reactor with the intermediate screen insert installed between the outer screen or scallop and center pipe screen. The bottom of the intermediate screen is made such that the catalyst bed near the center pipe screen is tapered with a smaller opening at the bottom end.
Figure 4:
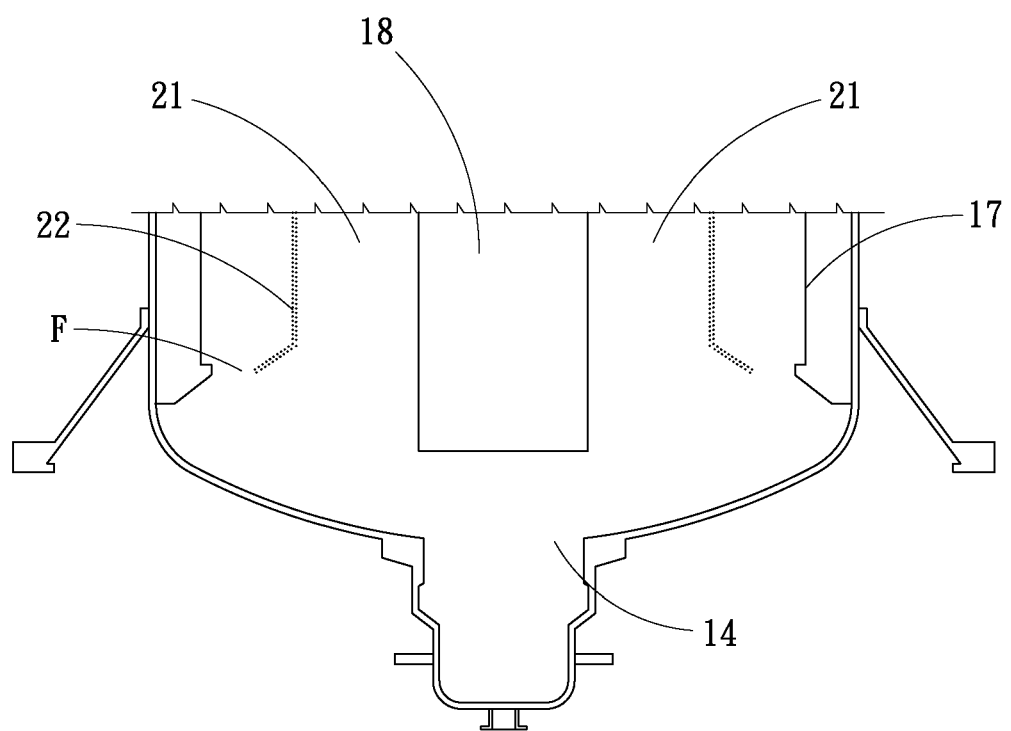
FIG. 4 presents a radial flow moving bed reactor with the intermediate screen insert installed between the outer screen or scallop and center pipe screen. The bottom of the intermediate screen insert is made such that the catalyst bed near the outer screen is tapered with a smaller opening at the bottom end.

FIGS. 3 and 4 give other applications of the intermediate screen in the catalytic reforming reactor. The catalyst 13 in FIG. 3 is transferred from the upper reactor to the reactor below through catalyst transfer pipe 19 into the seal area 24 and then the main catalyst bed and exits the lower reactor through conduit 14. The reactant flows through reactor inlet 15, outer basket screen 17, moving catalyst bed, center pipe screen 18 and exit the reactor through reactor outlet pipe 16. The inserted intermediate screen 20 has a screen cone at the bottom with tapered annular catalyst bed toward the center pipe screen 18. The perforation is through out the top straight and lower screen cone section. The intermediate screen is supported by the support rods (not shown in FIGS. 3 and 4). The cross sectional area at the bottom of the catalyst annular formed by the outer screen or scallop 17 and intermediate screen 20 is depicted as area E. The annular cross sectional area above area E but below the top of the intermediate screen 20 is less than the area E. As a result, the catalyst residence time in the annular above the area E decreases. On the other hand, the inserted intermediate screen 22 in FIG. 4 has a bottom screen cone with a tapered catalyst bed toward the outer screen or scallop 17. The catalyst flow annular channel above the area F has the characteristic that the cross sectional area above the area F is greater than the area F. The catalyst residence time in the annular above the area F increases and the catalyst residence time in the annular near the center pipe decreases in FIG. 4. The inserted screen in FIG. 4 helps to give a more uniform coke loading on the catalyst moving out of the reactor by decreasing the catalyst residence time near the center pipe screen 18.

Obviously many modifications and variations are possible in light of the above teachings. It is therefore to be understood that within the scope of the appended claims the present invention can be practiced otherwise than as specifically described herein. Although specific embodiments have been illustrated and described herein, it is obvious to those skilled in the art that many modifications of the present invention may be made without departing from what is intended to be limited solely by the appended claims.

What is claimed is:

1. A radial flow moving bed regeneration/reaction system in which a plurality of solid particles moves gravitationally into and out of the system in a continuous or semi-continuous mode in dense phase, comprising:

a vertically oriented cylindrical outer vessel;

an outer cylindrical particle retention screen and an inner cylindrical particle retention screen, wherein both the outer screen and the inner screen are located within the outer vessel and concentric with the central vertical axis of the outer vessel;

an annular reactant distribution volume between the vessel and the outer screen, wherein the annular reactant distribution volume is communicated with at least one reactant inlet conduit for introducing a reactant fluid;

an annular particle retention volume between the outer screen and the inner screen, wherein the annular particle retention volume is used for the regeneration/reaction, at least one particle inlet conduit communicates with the upper end of the annular particle retention volume, at least one particle withdrawal conduit communicates with the lower end of the annular particle retention volume, and a bed depth is defined as the distance between the outer screen and the inner screen;

at least one intermediate screen inserted between the outer screen and the inner screen in the particle retention volume, the reactant fluid traverses across the intermediate screen but with no solid particle traverses across the same screen, wherein the intermediate screen divides the annular particle retention volume in all or at least part of the volume into at least two flow channels, by adjusting the intermediate screen location or slope or cross sectional opening at the bottom of the intermediate screen, the residence time of the solid particle in at least one flow channel is changed; and a cylindrical effluent collection volume within the inner screen, wherein at least one reactant outlet conduit communicates with the effluent collection volume.

2. The system according to claim 1, wherein at least one flow channel has different bottom cross sectional area than all or part of the cross sectional area above it of the same flow channel.

3. The system according to claim 1, wherein the intermediate screen is cone-shaped.

4. The system according to claim 1, wherein the intermediate screen is a combined shape with cylinder and cone.

5. The system according to claim 1, wherein the distance between the bottom of the intermediate screen opening and the particle withdrawal outlet conduit is equal to or greater than 15% of the bed depth.

6. The system according to claim 1, wherein the distance between the bottom of the intermediate screen opening and the particle withdrawal outlet conduit is equal to or greater than 80% of the bed depth.

7. The system according to claim 1, wherein the solid particle residence time in the flow channel decreases when the bottom cross sectional opening area is greater than the average cross sectional area of the same flow channel.

8. The system according to claim 1, wherein the intermediate screen between the outer and inner flow channels form angle from horizontal in all or part of the screen and this angle is no less than the angle of repose of the solid particle in it.

9. The system according to claim 1, wherein the moving velocity of the solid particles is equal to or less than 1 ft/minute.

10. The system according to claim 1, wherein the solid particle comprises one selected from the group consisting of the following: catalyst, adsorbent.

11. The system according to claim 1, wherein the reactant fluid comprises one selected from the group consisting of the following: diluted air for catalyst regeneration, hydrocarbons, flue gas, and waste stream from a process unit.

12. An radial flow moving bed coke removal system in which a plurality of catalyst particles moves gravitationally into and out of the system in a continuous or semi-continuous mode, comprising:

a vertically oriented cylindrical outer vessel;

an outer cylindrical catalyst retention screen and an inner cylindrical catalyst retention screen, wherein both the outer screen and the inner screen are located within the outer vessel and concentric with the central vertical axis of the outer vessel;

an annular reactant distribution volume between the vessel and the outer screen, wherein the annular reactant distribution volume is communicated with at least one reactant inlet conduit for introducing a oxygen-containing gas;

an annular catalyst retention volume between the outer screen and the inner screen, wherein the annular catalyst retention volume is used for the regeneration/reaction, at least one catalyst inlet conduit communicates with the upper end of the annular catalyst retention volume, at least one catalyst withdrawal conduit communicates with the lower end of the annular catalyst retention volume, and a bed depth is defined as the distance between the outer screen and the inner screen;

at least one intermediate screen inserted between the outer screen and the inner screen in the catalyst retention volume with the oxygen-containing gas traverses across the intermediate screen but no solid particle traverses across the same screen, wherein the intermediate screen divides the annular catalyst retention volume in all or at least part of the volume into outer and inner flow channels, the inner flow channel formed between the intermediate screen and the inner screen is tapered in the bottom with a smaller cross sectional area than the average cross sectional area of the same flow channel, so as to increase the residence time of the catalyst particles in inner flow channel; and a cylindrical effluent collection volume within the inner screen, wherein at least one reactant outlet conduit communicates with the effluent collection volume.

13. The system according to claim 12, wherein the intermediate screen is cone-shaped.

14. The system according to claim 12, wherein the intermediate screen is a combined shape with cylinder and cone.

15. The system according to claim 12, wherein the distance between the bottom of the intermediate screen opening and the particle withdrawal outlet conduit is equal to or greater than 15% of the bed depth.

16. The system according to claim 12, wherein the distance between the bottom of the intermediate screen opening and the particle withdrawal outlet conduit is equal to or greater than 80% of the bed depth.

17. The system according to claim 12, wherein the moving velocity of the catalyst particles is equal to or less than 1 ft/minute.

18. The system according to claim 12, wherein the catalyst particles withdrawn from the system have a coke content equal to or less than 0.2 wt. % of the particles.

* * * * *